United States Patent [19]

Yakymyshyn et al.

[11] Patent Number: 5,396,362
[45] Date of Patent: Mar. 7, 1995

[54] HIGH RESOLUTION MICROMACHINING OF ORGANIC CRYSTALS AND OPTICAL MODULATORS FORMED THEREBY

[75] Inventors: Christopher P. Yakymyshyn; Yung S. Liu, both of Schenectady; Renato Guida, Wynantskill, all of N.Y.

[73] Assignee: General Electric Company, Schenectady, N.Y.

[21] Appl. No.: 77,698

[22] Filed: Jun. 18, 1993

[51] Int. Cl.[6] ............................................. G02F 1/03
[52] U.S. Cl. ................................. 359/245; 359/254; 359/181; 528/210
[58] Field of Search ............... 359/245, 254, 181; 528/210, 422; 455/605, 612, 617

[56] References Cited

U.S. PATENT DOCUMENTS 5,185,675 2/1993 Banks ................................. 359/245
5,294,694 3/1994 Epstein et al. .................... 528/210

OTHER PUBLICATIONS

Laser Ablation of Polymers for High-Density Interconnect, Y. S. Liu et al., Elsevier Science Publishers B.V., 1993, pp. 15–29.
Fibre Optic Wavelength Channel Selector With High Resolution, W. Johnstone et al., Electronics Letters, Jul. 2, 1992, vol. 28, No. 14, pp. 1364–1365.
Investigation of Optical Fibre Switch Using Electro-Optic Interlays, K. McCallion et al, Electronic Letters, Feb. 13, 1992, vol. 28, No. 4, pp. 410–411.

Primary Examiner—Joseph A. Popek
Assistant Examiner—Huan Hoang
Attorney, Agent, or Firm—Donald S. Ingraham; Marvin Snyder

[57] ABSTRACT

Micromachined organic crystals are used in electro-optic modulators to provide high speed modulation capability. Machined modulator blocks of organic crystal material, such as dimethylamino n-methylstilbazolium tosylate (DAST), have smooth surfaces adapted to couple light between the organic crystal and a medium adjoining the crystal in the electro-optic modulator. Electrodes are disposed with respect to the modulator block such that an electric field is generated along a selected axis corresponding to the polar axis of the organic crystal. A method of machining the soft organic crystal adapted for use as a modulator includes illuminating the organic crystal material via an opaque mask having a selected pattern corresponding to a desired machined pattern for the organic crystal. The light illuminating the organic crystal has a wavelength corresponding to strong absorption bands in the organic crystal and is pulsed so as to ablate the surface in correspondence with the pattern in a non-contact self-developing machining process.

29 Claims, 2 Drawing Sheets

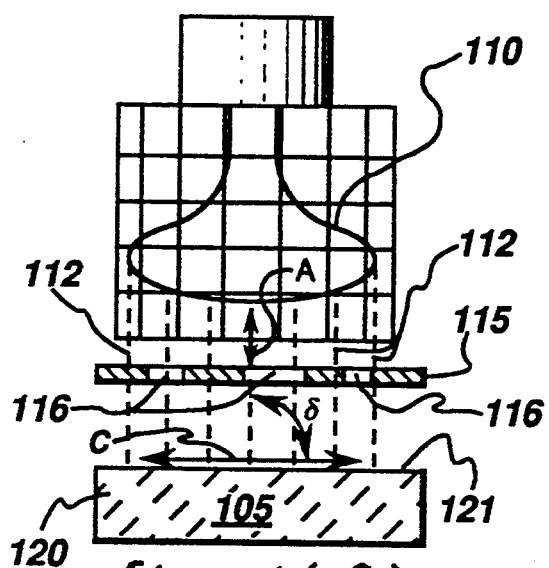
fig. 1(A)
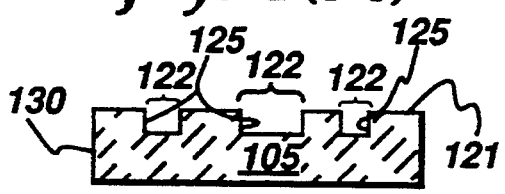
fig. 1(B)
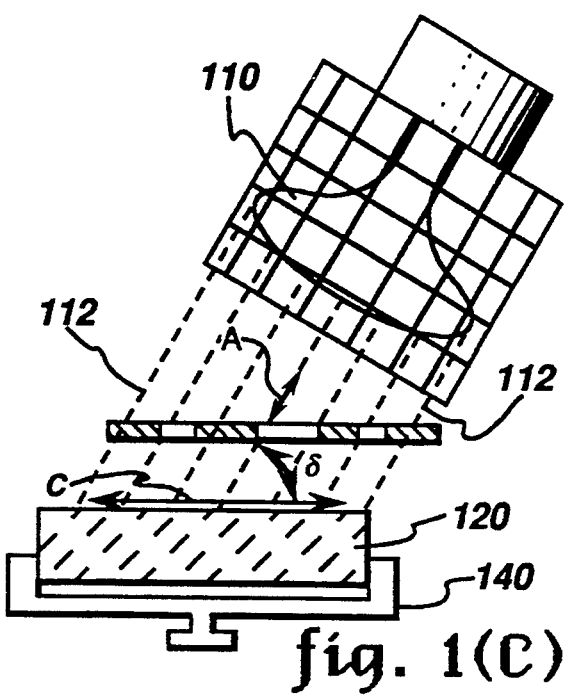
fig. 1(C)
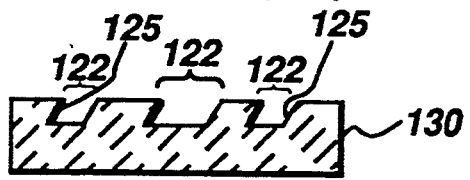
fig. 1(D)
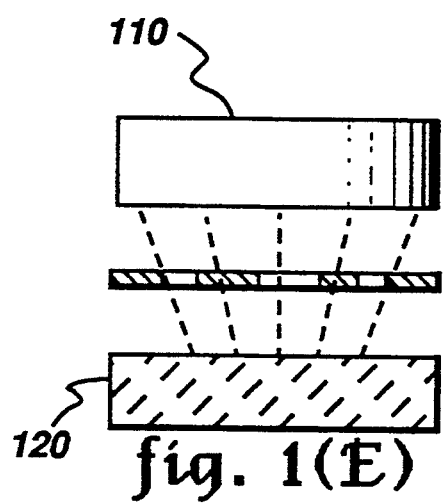
fig. 1(E)
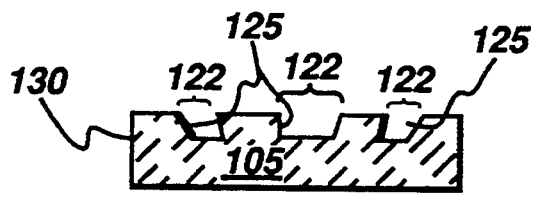
fig. 1(F)
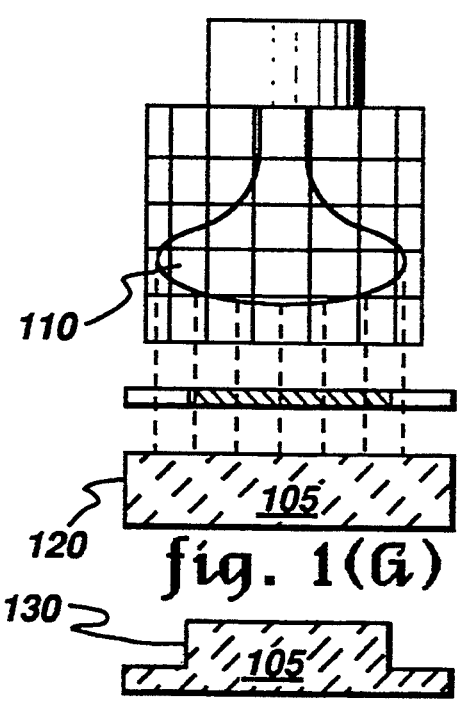
fig. 1(G)
fig. 1(H)

HIGH RESOLUTION MICROMACHINING OF ORGANIC CRYSTALS AND OPTICAL MODULATORS FORMED THEREBY

BACKGROUND OF THE INVENTION

This invention relates generally to patterned organic crystals and in particular to organic crystals adapted for use in electro-optic modulators and the method for patterning the relatively soft organic crystal to obtain a desired pattern having relatively smooth surfaces adapted for optically coupling light between the organic crystal and an adjoining medium.

Electro-optic modulators are devices which selectively pass light of a particular polarization in response to an applied electric field. Control of the applied electric field thus provides a means of modulating an optical signal. Optical processing of information typically offers advantages over electronic-only processing in that optical processing systems can provide faster processing, take up less space and weight, and are less susceptible to interference from environmental conditions (such as electromagnetic interference). For example, optical processing systems incorporating electro-optic modulators can be used in signal processing systems in satellites to reduce weight (and therefore launch costs) and susceptibility to electromagnetic interference; in medical equipment such as ultrasound devices to save space and allow increased density of imaging pixels; as electric field sensors in sensitive areas, such as where high radiation fields exist (e.g., in some medical imaging devices); and in phased array radar systems in which the optical processing provides high data rates along with the space, weight, and stability advantages.

Inorganic crystals such as lithium niobate or lithium tantalate are commonly used as electro-optic modulators. One measure of a material's sensitivity as an electro-optic material is the electro-optic figure of merit (FOM), which is determined in accordance with the following formula:

$$FOM = n^3 r / \epsilon$$

in which n is the refractive index;
r is the Pockels coefficient; and
$\epsilon$ is the dielectric constant at the sampling frequencies of interest.

Lithium niobate, for example, has a FOM of 11.4 pm/V, and lithium tantalate has a FOM of 7.1 pm/V.

In qualitative terms, an effective electro-optic modulator desirably is capable of rapidly modulating an optical signal, thus allowing a high data rate for information passed by the optical signal. The modulating material preferably is thermally and mechanically stable and further comprises a material that can be readily patterned to form smooth surfaces which are appropriate for coupling light between an adjoining medium and the modulator material. It is further desirable that the modulator material be readily patterned into structures that are adapted for use as modulators, providing, for example, for placement of electrodes on the modulator device and attachment of the device to substrates to allow coupling to other optical components. A further desirable characteristic of a modulator is the ability to be driven by a relatively low voltage (electric field).

It is thus an object of this invention to provide a high performance electro-optic modulator that provides high speed modulation capability with high damage thresholds (e.g., as shown by high mechanical and thermal stability), low drive voltages, and optical transparency in a useful window.

A further object of this invention is to provide a method of readily patterning an organic crystal material having the desired electro-optic modulator characteristics.

A still further object of this invention is to provide a non-contact, self-developing precision patterning method for a soft organic crystal.

Another object of this invention is to provide a precision patterning method for organic crystals that reduces damage to the substrate material underlying the crystal.

A yet further object of this invention is to provide a precision patterning method that can be used for making structures having a relatively high aspect ratio in a soft organic crystal.

SUMMARY OF THE INVENTION

In accordance with this invention, an electro-optic modulator includes a modulator block of an organic crystal having optical non-linearities and that is machined to have a smooth optical coupling surface adapted to receive the optical signal to be modulated, and electrodes disposed in spaced relationship with the modulator block so as to selectively apply an electric field across the modulator block. The organic crystal is typically an organic salt selected from the group comprising dimethylamino n-methylstilbazolium tosylate (DAST), 4-methoxy stibazolium tosylate (MOST), and 3,4 dihydroxy stibazolium tosylate. The organic crystal comprising the modulator block is disposed such that the field lines of the applied electric field are substantially parallel to the polar axis of the organic crystal. Further, in accordance with one embodiment of this invention, the modulator block is disposed between two reflectors so as to form a resonator assembly, with the electrodes disposed so that the resonator is adapted to modulate an optical signal coupled to the resonator.

A method of micromachining organic crystals comprises the step of illuminating the organic crystal through an opaque mask having a selected pattern corresponding to a desired machined pattern for the organic crystal. The step of illuminating the organic crystal includes pulsing a light source to deliver temporally distinct energy levels of light to the organic crystal with the energy level of the light being selected to correspond to strong absorption bands in the organic crystal. The step of illuminating the organic crystal further comprises the step of controlling the angle of rays of light energy incident on the surface of the organic crystal so as to selectively machine the organic crystal to form depressions therein having a desired sidewall configuration and high aspect ratio. In machining the organic crystal, the angle of incidence of the light energy rays is controllable though collimation of the light energy, positioning the light source with respect to the organic crystal, and moving the organic crystal block with respect to the opaque mask.

BRIEF DESCRIPTION OF THE DRAWINGS

The features of the invention believed to be novel are set forth with particularity in the appended claims. The invention itself, however, both as to organization and method of operation, together with further objects and advantages thereof, may best be understood by reference to the following description in conjunction with the accompanying drawings in which like characters represent like parts throughout the drawings, and in which:

FIGS. 1(A)–1(H) are schematic representations of methods of illuminating an organic crystal to micromachine a desired pattern in the crystal in accordance with the present invention and accompanying illustrations of the machined crystal.

DETAILED DESCRIPTION OF THE INVENTION

Figure 2A:
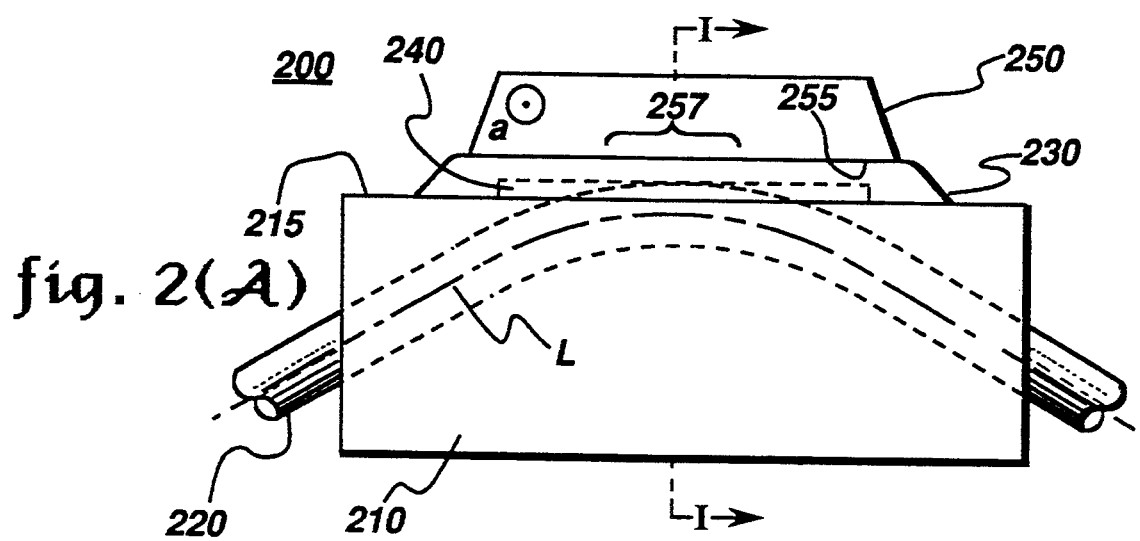
FIG. 2(A) is a schematic view of an electro-optic modulator in accordance with one embodiment of the present invention.

Organic crystals exhibiting optical non-linearities (typically referred to as second order nonlinearities) provide superior properties for use as electro-optic modulators, such as requiring relatively small drive voltages; having optical transparency in a useful window (i.e., at wavelengths corresponding to light energy commonly used in optical processing systems, such as 800 nm to 2100 nm); and high damage thresholds (evidencing thermal and mechanical stability in the environment to which the electro-optic modulator is exposed). For example, dimethylamino n-methylstilbazolium tosylate (DAST) crystallizes in a monoclinic space group with a high degree of chomophore orientation along a polar axis. This orientation results in a large electro-optic coefficient, while maintaining a relatively low dielectric constant. The ionic crystalline bonding results in a relatively high (about 260° C.) melting point, providing good thermal stability, and a relatively high optical damage threshold (e.g., 1 MW/cm$^2$ continuous wave at 800 nm and >10 GW/cm$^2$ with 100 femtosecond pulses at 800 nm) in the material's range of transparency. DAST also exhibits a relatively high dielectric strength (greater than about 20 V/$\mu$m). DAST further has an electro-optic figure of merit of 133 pm/V, which is more than a factor of 12 better than inorganic materials currently being used as electro-optic modulators (the FOM is based upon a Pockels coefficient of 100 pm/V, a refractive index of 2.2 at 8000 nm, and dielectric constant of 8).

Organic crystals having the desired electro-optic characteristics, however, are typically very soft, having a hardness value of about 2 or less on the Mohs hardness scale (a value of 15 representing the maximum hardness). DAST, for example, has a Mohs hardness rating of between about 1 and 2. This softness has precluded successfully patterning organic crystals in the manner necessary to make them useful in electro-optic devices. In common conventional patterning techniques, such as etching, the crystal material decomposes so that smooth, clean surfaces necessary for coupling light between the crystal and adjoining medium are not obtainable. Mechanical polishing is also ineffective as the soft material peels away or cracks.

A method of micromachining organic crystals in accordance with this invention is illustrated in FIGS. 1(A)–1(H). The method of micromachining comprises the step of illuminating an organic crystal via an opaque mask having a selected pattern corresponding to a desired machined pattern in the organic crystal. For example, in FIG. 1(A), an organic crystal 105 in a block 120 is exposed to light energy from a light source 110 via a mask 115 that is opaque to light energy from light source 110. Organic crystal 105 comprises, for example, an organic salt such as DAST, 4-methoxy stibazolium tosylate (MOST), or 3,4 dihydroxy stibazolium tosylate. These salts exhibit second order optical non-linearities and are adapted for use as electro-optic modulators. Alternatively, other organic crystals that are not salts, such as 2-methyl 4-nitroaniline (MNA) can be patterned in accordance with the method of this invention. Organic crystal 105 further exhibits strong absorption bands for certain wavelengths of light such that most of the energy in incident light rays of these wavelengths is absorbed in the crystal structure within a few microns or less of the crystal surface. DAST, for example, has strong (e.g., $\alpha \approx 500$ cm$^{-1}$ to 2000 cm$^{-1}$) absorption bands in the wavelength range between about 250 nm to 500 nm.

Light source 110 is adapted so that it generates light rays having wavelengths corresponding to strong absorption bands in organic crystal 105. Light source 110 is typically further adapted such that it generates pulses of light rays so that light energy is delivered to the organic crystal in temporally distinct pulses. For example, light source 110 typically comprises a laser, such as an excimer laser, adapted to operate in a mode in which temporally distinct pulses of energy are delivered to organic crystal 105, The wavelength of the laser is further selected to correspond to the strong absorption bands in organic crystal 105; for example ultraviolet light rays generated by an excimer laser have wavelengths in the range between about 190 nm and 350 nm, which corresponds to the strong absorption bands in DAST and most organic crystals. Light source 110 further is adapted to generate light rays having an energy density selected to cause photochemical decomposition of organic crystal 105; a typical range of acceptable energy density of light source 110 for machining DAST is between about 100 mJ/cm$^2$ and 1000 mJ/cm$^2$.

A portion of the light rays emanating from light source 110 pass through openings 116 in mask 115 and impinge upon organic crystal block 120; the remaining portion of the rays from light source 110 are absorbed in mask 115. Openings 116 in mask 115 form a selected pattern corresponding to the machined structure desired to be produced in organic crystal block 120. Opaque mask 115 comprises a material, such as copper or the like, which has a high absorption cross section for the light rays. Light rays that pass through mask 115 strike organic crystal block 120 and are absorbed. Typically, the energy level of the incident ray is of a sufficient level to cause ablation of the organic crystal surface so as to machine the organic crystal to form a structure corresponding to the mask pattern.

Ablating the organic crystal provides a non-contact, self developing patterning technique (that is, no mechanical contact is made with the organic material and no additional treatment with etchants or solvents or the like is necessary to machine the surface to have the desired structure). The ablation typically results from photochemical decomposition of the organic crystal bonds as a result of the incident photon having sufficient energy to break the chemical bonds of the organic material. Alternative mechanisms of ablation comprise thermal decomposition of the organic material as a result of heating of the material through the absorption of the incident photons in the light rays. In the ablation process, the decomposition products from the processed regions of the surface typically are ejected from the processed area in a gaseous plume.

For a given organic crystal, the depth to which the organic crystal is ablated, or machined, is a function of the energy density of the incident light rays and the length of time to which the organic crystal is exposed to the radiation. For a given light source that generates pulses of a selected energy density, depth of machining is controlled by varying the integrated fluence of the light rays, for example by controlling the total number of pulses delivered to a given organic crystal. As noted above, light source 110 is typically adapted to provide pulsed light rays; pulsing the energy delivered to the organic crystal material reduces the heating of the organic crystal material outside of the immediate area in which the light rays are absorbed, thus reducing deformation or damage to the crystal material in areas of other than the portion of the crystal desired to be machined. The ablated surfaces are smooth and adapted for efficient coupling of light into and out of the organic crystal, and the machined crystalline surface has a smoother morphology than the unprocessed surface.

As illustrated in FIG. 1(A), light source 110 is adapted such that a plurality of light rays 112, shown in the Figure by representative lines at either end of opaque mask 115, are collimated and aligned along a selected axis A. Selected axis A is disposed at a selected incidence angle $\partial$ with respect to an axis "C" in a surface 121 of organic crystal block 120. In FIG. 1(A), light rays from light source 110 pass along axis A which is substantially perpendicular to axis C of the organic crystal block such that selected incidence angle $\partial$ is about 90°.

The method of the present invention results in the formation of a machined organic crystal block 130. Machined crystal block 130 comprises machined areas 122 in the portion of the crystal block in which light rays 112 were absorbed. As shown in FIG. 1(B), each machined area 122 comprises sidewalls 125. As the light rays were incident on the crystal block substantially perpendicular to surface 121 of block 120, sidewalls 125 are similarly substantially perpendicular to surface 121. Machined areas 122 correspond to the patterned openings 116 in opaque mask 115.

FIGS. 1(C) through 1(H) illustrate other examples of the method of this invention; except as noted below, however, all information discussed above with respect to FIGS. 1(A) and 1(B) similarly apply to these examples of the invention. In particular, in FIG. 1(C), light source 110 is disposed with respect to organic crystal block 120 such that selected incidence angle $\partial$ is other than about 90° so that collimated light rays 112 emanating from light source 110 strike surface 121 at an angle $\partial$ that allows the machining of high aspect ratio features in the organic crystal.

As a result of selected incidence angle $\partial$ being other than 90°, sidewalls 125 in machined areas 122 of machined organic crystal block 130 (FIG. 1(D)) have a slope corresponding to the selected incidence angle $\partial$. Selected incidence angle $\partial$ is determined by the relative positions of light source 110 and organic crystal block 120. Crystal block 120 can be placed in a desired spaced relationship with light source 110 to provide the selected incidence angle $\partial$ for collimated light beams emanating from light source 110 by selectively positioning light source 110, or alternatively, selectively positioning crystal block 120, for example with a movable support 140 in which block 120 is placed for the machining process.

A further embodiment of the present invention is illustrated in FIGS. 1(E) and 1(F). In this embodiment light source 110 is adapted to generate a plurality of light rays 112, each having a respective selected axis and a selected incidence angle $\partial$ at surface 121 of organic crystal block 120. For example, light source 110 typically comprises a focusing lens (not shown) which directs light rays along a path towards a focal point; positioning crystal block 120 with respect to light source 110 at a selected distance with respect to the focal point of the lens determines the respective selected incident angles $\partial$ of the light rays incident on the surface of crystal block 120. This arrangement enables machined crystal block 130 to have machined areas 122 with respective sidewalls 125 in machined block 130 having differing amounts of slope (FIG. 1(F)).

Figure 3:
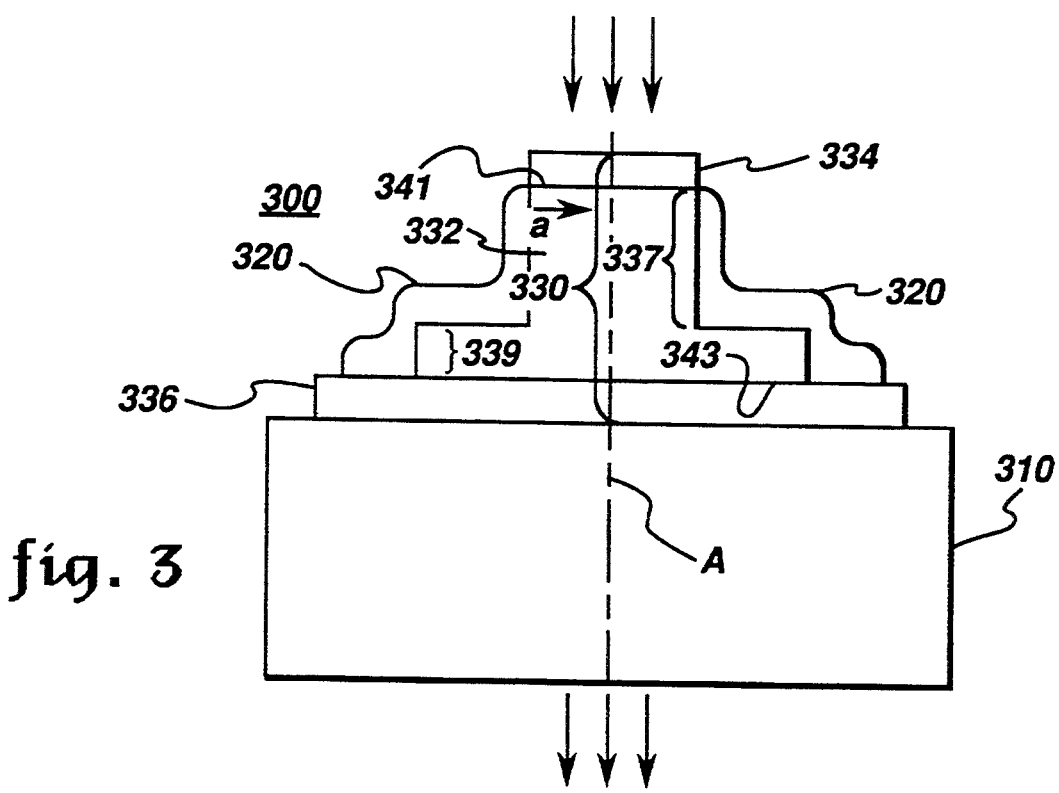
FIG. 3 is a schematic view of an electro-optic modulator in accordance with another embodiment of the present invention.

FIGS. 1(G) and 1(H) illustrate a portion of the method of the present invention as used in the fabrication of a structure of the type described in detail with respect to FIG. 3. In this fabrication process, block 120 is exposed to light from light source 110 so as to form a machined block 130 having an island structure.

The present invention thus allows a patterned organic crystal to be fabricated having a desired machined structure in accordance with the procedure described above. The patterned organic crystal is fabricated in a non-contact, high resolution process that is self developing and that produces machined areas in which the machined surfaces are adapted for coupling light into and out of the organic crystal material. The high resolution of this process enables the fabrication of patterned crystals having precise machined features with sub-micron dimensions, and also have high aspect ratios (e.g., 5:1 or greater).

Figure 2B:
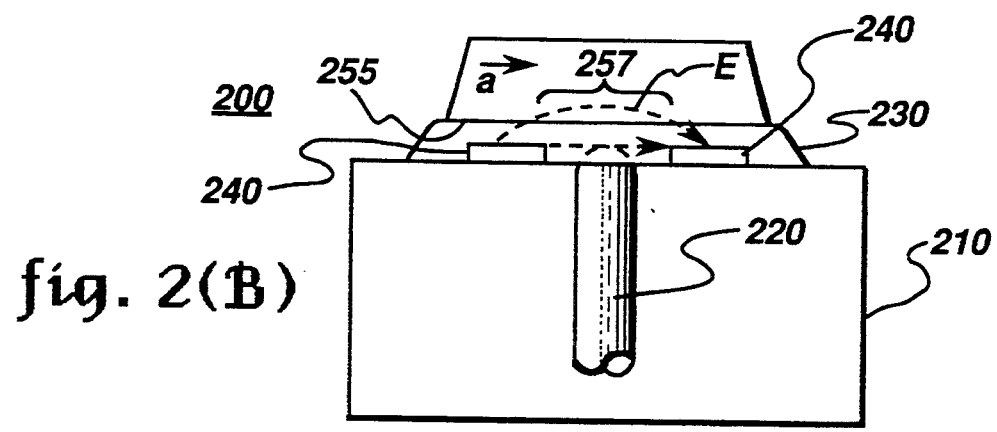
FIG. 2(B) is a cross-sectional view of the electro-optic modulator illustrated in FIG. 2(A) taken along the line I—I in that Figure.

One embodiment of an electro-optic modulator 200 in accordance with this invention is illustrated in FIGS. 2(A) and 2(B). Electo-optic modulator 200 comprises a substrate 210 such as a quartz block or the like and an optical fiber 220 disposed within substrate 210 so that a portion of optical fiber is disposed within the plane of a coupling surface 215 of substrate 210. Optical fiber typically comprises an optical fiber adapted to pass polarized light along an axis "L" of the fiber and that is disposed in an arcuate-shape within substrate 210 such that axis L is disposed at or in close proximity (e.g., 1 to 2 μm) to coupling surface 215, with a portion of the cladding of optical fiber 220 being removed, such as by polishing, so that coupling surface 215 and the portion of optical fiber 220 in the plane of the coupling surface present a substantially smooth surface.

Electro-optic modulator 200 further comprises a buffer layer 230 comprising a material exhibiting selected optical coupling characteristics, electrodes 240 (shown in phantom in FIG. 2(A)) disposed in said buffer layer in a predetermined position with respect to axis L of the optical fiber, and an electro-optic modulator block 250 optically coupled to buffer layer 230. Buffer layer 230 comprises a material, such as a polymer or the like, exhibiting an optical index of refraction so as to efficiently couple light between the portion of optical fiber 220 disposed in the plane of coupling surface 215 of substrate 210 and electro-optic modulator block 250.

Electro-optic modulator block 250 comprises an organic crystal having optical non-linearities such that the application of an electric field along a selected axis of the crystal effectively controls the amount of light of a selected polarization coupled into (or out of) the crystal. The organic crystal typically comprises an organic salt such as dimethylamino n-methylstilbazolium tosylate (DAST); alternatively, other organic crystals such as 4-methoxy stibazolium tosylate (MOST), or 3,4 dihydroxy stibazolium tosylate can also be used.

In accordance with this invention, electro-optic modulator block 250 is machined so as to have a smooth optical coupling surface 255 adapted to optically couple light between the organic crystal and the adjoining medium (buffer layer 230 as illustrated in FIGS. 2(A) and 2(B)). Optical coupling surface 255 is coupled to buffer layer 230 so as to receive the optical signal to be modulated from optical fiber 220. Modulator block 250 is disposed with respect to electrodes 240 such that the electric field across the electrode configuration is substantially aligned with the polar axis of the organic crystal comprising modulator block 250. The polar axis of the organic crystal is illustrated in FIGS. 2(A) and 2(B) by the designation "a"; in FIG. 2(A) the polar axis is disposed such that it extends from the plane of the illustration, and in FIG. 2(B) it is disposed such that it extends parallel to optical coupling surface 255. Electric field "E" is illustrated in FIG. 2(B) by the dashed line, indicating the electric field generated by electrodes 240 is substantially parallel to the polar axis of the organic crystal in an aperture area 257 of organic crystal block 250.

In operation, light polarized in the direction of the polar axis of organic crystal in modulator block 250 is passed through optical fiber 220 and is modulated in correspondence with the electric field applied to electro-optic modulator block 250. In the absence of an electric field, light passing through the optical fiber is not coupled into electro-optic modulator block 250; when an electric field is applied, light of a polarization corresponding to the polar axis of the organic crystal is coupled from optical fiber 220 in the vicinity of aperture area 257. In this coupling arrangement the evanscent field associated with the optical fiber is used to enable the coupling of light to the modulator from the portion of optical fiber where portions of the cladding of optical fiber 220 have been removed to form the smooth features of coupling surface 215 and from the portions of optical fiber 220 disposed in the plane of that surface. Light energy of a selected polarization in the fiber is coupled through the optical-coupling buffer layer and into electro-optic modulator block 250, where the light energy is attenuated. Alternatively coupling the light into electro-optic modulator 250 and allowing it to pass along optical fiber 220 in correspondence with the applied electric field modulates the signal.

A further embodiment of the present invention is illustrated in FIG. 3. An electro-optic modulator 300 comprises a substrate 310, electrodes 320, and an optical resonator assembly 330. Substrate 310 comprises an optically transparent material at the wavelengths of the light signal to be modulated, such as quartz or the like. Optical resonator assembly 330 comprises a modulator block 332 disposed between a first reflector 334 and a second reflector 336 so as to form a Fabry-Perot cavity. A general description of Fabry-Perot cavities (also called etalons) appears in B. Saleh and M. Teich, *Fundamentals of Photonics*, chap 9, § 9.1 (1991), which is incorporated herein by reference. Resonator assembly 330 is disposed on substrate 310 such that an optical transmission axis "A" that is substantially perpendicular to the plane of reflectors 334 and 336 extends between first and second reflectors and through substrate 310. First and second reflectors 334, 336 typically comprise dielectric mirrors, that is a mirror comprising layers of dielectric materials having respective indices of refraction assembled so as to provide the desired reflectance of light having a predetermined wavelength. Modulator block 332 comprises an organic crystal, for example an organic salt such as dimethylamino n-methylstilbazolium tosylate (DAST); alternatively, other organic crystals such as 4-methoxy stibazolium tosylate (MOST), or 3,4 dihydroxy stibazolium tosylate may be used. The organic crystal comprising modulator block 332 further exhibits optical non-linearities so that the index of refraction of the material changes in dependence on an applied electric field.

Modulator block 332 typically comprises a monolithic block (or mass) of organic crystal material that is machined such that an island portion 337 extends from a foundation portion 339; island portion 337 terminates in a first optical coupling surface 341 that is smooth and adapted for coupling light between an adjoining medium and the organic crystal. The opposing surface of modulator block 332 to first optical coupling surface 341 comprises second optical coupling surface 343, which is similarly smooth and adapted for coupling light between an adjoining medium and the organic crystal. First optical coupling surface is couped to first reflector 334, and second optical coupling surface is coupled to second reflector 336. Island portion 337 typically extends between about 50 $\mu$m and 1000 $\mu$m from foundation portion 339, and the width of first optical coupling surface 341 is typically between about 10 $\mu$m and 100 $\mu$m.

Electrodes 320 are disposed in proximity to resonator assembly 330 so as to apply an electric field across the resonator assembly along a selected axis. The selected axis of the electric field corresponds with the polar axis of the organic crystal material comprising modulator block 332. Modulator block 332 is disposed within resonator assembly 330 such that the polar axis of the organic crystal comprising the modulator block is substantially parallel to the the planes of first and second optical coupling surfaces 341, 343. Electrodes 320 are disposed along at least the sidewalls of island portion 337 of modulator block 332, and typically extend along corresponding portions of the foundation portion 339 and second dielectric mirror 334 in a fashion that facilitates fabrication and contact to the source (not shown) of the the electrical modulating signal.

In operation, the light signal to be modulated is coupled into optical resonator assembly via first reflector 334. At least a portion of the light signal to be modulated is linearly polarized along an axis corresponding to the polar axis of the organic crystal material comprising modulator block 332. Light passes through first reflector 334 into modulator block 332 and towards second reflector 336. Within the resonator assembly much of the light energy is reflected between first and second reflectors 334, 336 while some portion of the light energy passes from the assembly through second reflector 336 and thence through substrate 310 along the optical transmission axis A. The amount of light that escapes from the resonator assembly is controllable based upon the index of refraction of modulator block 332. Thus, by applying a selected electric field across the organic crystal comprising modulator block 332, the refractive index of the modulator block is changed and the transmission figure of the Fabry-Perot cavity is changed, thereby modulating the optical signal emanating from the resonator assembly in correspondence with the applied electrical field.

Use of machined organic crystals in accordance with this invention provides enhanced electro-optic modulators that exhibit high speed modulation capability (typically 1 GHz or greater). These electro-optic modulators also exhibit high damage thresholds, require relatively low drive voltages and exhibit an optical transparency in a useful window for typical optical processing systems. Other examples of uses of modulators fabricated in accordance with this invention appear in co-pending application Ser. No. 08/077,699, filed concurrently herewith, which is assigned to the assignee of the present invention and incorporated herein by reference.

While only certain features of the invention have been illustrated and described herein, many modifications and changes will occur to those skilled in the art. It is, therefore, to be understood that the appended claims are intended to cover all such modifications and changes as fall within the true spirit of the invention.

What is claimed is:

1. An electro-optic modulator for modulating a polarized optical signal, the modulator comprising:
  a modulator block comprising an organic crystal exhibiting optical non-linearities, said organic crystal comprising an organic salt selected from the group consisting of dimethylamino n-methylstilbazolium tosylate (DAST). 4-methoxy stilbazolium tosylate (MOST), and 3,4 dihydroxy stilbazolium tosylate; and
  electrical conductors adapted to selectively apply an electric field across said organic crystal so as to selectively control modulation of said optical signal through said organic crystal in response to said electric field and dependent upon the polarization orientation of light in said signal;
  said modulator block being machined so as to have at least one smooth optical coupling surface adapted to receive said optical signal to be modulated.

2. The modulator of claim 1 wherein said smooth optical coupling surface is disposed in a plane parallel to the polar axis of said organic salt.

3. The modulator of claim 2 further comprising means for coupling an optical signal to be modulated to said organic crystal.

4. The modulator of claim 3 wherein said means for coupling an optical signal to said organic crystal comprises:
  a substrate having a coupling surface;
  an optical fiber disposed within said substrate, said optical fiber being shaped so that a portion of said optical fiber is disposed within the plane of the substrate coupling surface; and
  a buffer layer disposed over said coupling surface and portion of said optical fiber disposed within the plane of said coupling surface;
  said smooth optical Coupling surface of said modulator block being coupled to said buffer layer to form a modulator aperture with the portion of said optical fiber disposed within the plane of the substrate coupling surface such that light of a selected polarization passing through said optical fiber is coupleable into said modulator block via said modulator aperture.

5. The modulator of claim 4 wherein said electrical conductors adapted to selectively apply an electric field comprise electrodes disposed in proximity to said optical fiber and adapted to selectively establish an electric field in said modulator block so as to cause light of a selected polarization passing through said optical fiber to be coupled into said modulator block via said modulator aperture.

6. The modulator of claim 5 wherein said electrodes are adapted to generate an electric field parallel to the polar axis of said organic crystal in said modulator block.

7. A method of micromachining organic crystals comprising the step of:
  illuminating an organic crystal via an opaque mask having a selected pattern corresponding to a desired machined pattern for said organic crystal, said crystal comprising an organic salt selected from the group consisting of dimethylamino n-methylstibazolium tosylate (DAST), 4-methoxy stilbazolium tosylate (MOST), and 3,4 dihydroxy stilbaxolium tosylate.

8. The method of claim 7 wherein the step of illuminating said crystal further comprises selectively exposing said organic crystal to energy from a light source.

9. The method of claim 8 wherein the step of selectively exposing said organic crystal comprises pulsing said light source to deliver temporally distinct energy levels of light to said organic crystal.

10. The method of claim 9 wherein the wavelength of light energy generated by said light source corresponds with strong absorption bands in said organic crystal.

11. The method of claim 10 further comprising the step of machining a pattern in said organic crystal having substantially vertical sidewalls.

12. The method of claim 11 further comprising the step of passing collimated light energy through said opaque mask.

13. The method of claim 10 further comprising the step of machining a pattern in said organic crystal such that at least some machined areas have sloped sidewalls.

14. The method of claim 13 further comprising the step of passing light energy through said opaque mask, said collimated light energy being incident on said opaque mask at a selected incidence angle with respect to said organic crystal so as to generate desired sloped sidewalls in said organic crystal.

15. The method of claim 13 further comprising the step of passing collimated light rays having a selected incidence angle with respect to said organic crystal through said opaque mask.

16. The method of claim 15 further comprising the step of selectively disposing said organic crystal in a spaced relationship with said opaque mask to generate desired machined patterns in said organic crystal.

17. The method of claim 10 wherein said light source comprises a laser.

18. The method of claim 17 wherein the step of pulsing said light source further comprises generating a light pulse having an energy density selected to cause decomposition of portions of said organic crystal in which said light pulse is absorbed.

19. The method of claim 18 wherein said light source is adapted to generate ultraviolet light.

20. The method of claim 19 wherein the wavelength of the ultraviolet light pulse is in a range between about 190 nm and 350 nm, and the energy density of said light pulse is in a range between about 100 mJ/cm$^2$ and 1000 mJ/cm$^2$.

21. A patterned organic crystal prepared by a process comprising the steps of:

illuminating an organic crystal via an opaque mask having a selected pattern corresponding to a desired machined pattern for said organic crystal, said crystal comprising an organic salt selected from the group consisting of dimethylamino n-methylstilbazolium tosylate (DAST), 4-methoxy stilbazolium tosylate (MOST), and 3,4 dihydroxy stilbazolium tosylate.

22. The patterned organic crystal of claim 21 wherein the step of illuminating said organic crystal comprises pulsing a light source to deliver temporally distinct energy levels of light to said organic crystal.

23. The patterned organic crystal of claim 21 wherein said light source is adapted to generate ultraviolet light having a wavelength in the range between about 190 nm and 350 nm with an energy density between about 100 mJ/cm$^2$ and 1000 mJ/cm$^2$.

24. The patterned organic crystal of claim 22 wherein the wavelength of light energy generated by said light source corresponds with strong absorption bands in said organic crystal.

25. The patterned organic crystal of claim 24 wherein the step of illuminating said organic crystal further comprises the step of controlling the angle of rays of light energy incident on said opaque mask so as to selectively machine said organic crystal to form depressions therein having desired sidewall configurations.

26. The patterned organic crystal of claim 25 wherein said light source comprises a laser.

27. The patterned organic crystal of claim 26 wherein the step of pulsing said light source further comprises generating a light pulse having an energy density selected to cause decomposition of portions of said organic crystal in which said light pulse is absorbed.

28. The patterned organic crystal of claim 27 wherein said energy density of said light pulse is further selected such that said decomposition of said organic crystal generates a machined surface in said organic crystal that is relatively smooth and adapted for efficient optical coupling of light between said organic crystal and an adjoining medium.

29. The patterned organic crystal of claim 28 wherein said organic crystal exhibits optical non-linearity.

* * * * *